US006500578B1

United States Patent
Ong et al.

(10) Patent No.: US 6,500,578 B1
(45) Date of Patent: Dec. 31, 2002

(54) STACKING AND MANIFOLDING OF ANGULARLY OFFSET, UNITIZED SOLID OXIDE FUEL CELLS

(75) Inventors: Estela Ong, Rolling Hills Estates; Nguyen Minh, Fountain Valley, both of CA (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 0 days.

(21) Appl. No.: 09/546,308

(22) Filed: Apr. 10, 2000

(51) Int. Cl.[7] .............................. H01M 8/02; H01M 8/24
(52) U.S. Cl. ............................ 429/34; 429/18; 429/26
(58) Field of Search ................... 429/18, 26, 34

(56) References Cited

U.S. PATENT DOCUMENTS

| 3,505,114 A | * | 4/1970 | Rohr | 136/86 |
| 4,048,385 A | | 9/1977 | Regnaut | |
| 4,588,659 A | * | 5/1986 | Abens | 429/20 |
| 4,876,163 A | | 10/1989 | Reichner | |
| 4,910,100 A | | 3/1990 | Nakanishi et al. | |
| 5,298,341 A | | 3/1994 | Khandkar et al. | |
| 5,691,075 A | * | 11/1997 | Betawi | 429/32 |
| 5,861,221 A | | 1/1999 | Ledjeff et al. | |
| 6,232,005 B1 | * | 5/2001 | Pettit | 429/19 |

FOREIGN PATENT DOCUMENTS

| DE | 4438167 | * | 3/1996 | H01M/8/24 |
| JP | 599869 | * | 1/1984 | H01M/8/04 |

* cited by examiner

*Primary Examiner*—Patrick Ryan
*Assistant Examiner*—Mark Ruthkosky
(74) *Attorney, Agent, or Firm*—Sutherland Asbill & Brennan LLP

(57) ABSTRACT

A fuel cell stack comprises a plurality of planar fuel cells in a spiral configuration. The fuel cells angularly offset from one another such that immediately adjacent cells only partially overlap one another. The cells are preferably of the unitized type. A manifold assembly is operatively adjacent to the fuel cells. The manifold assembly includes an inlet manifold and an outlet manifold for each of the gases that are in communication with the fuel cells.

26 Claims, 4 Drawing Sheets

STACKING AND MANIFOLDING OF ANGULARLY OFFSET, UNITIZED SOLID OXIDE FUEL CELLS

BACKGROUND OF THE INVENTION

The present invention generally relates to planar, solid oxide fuel cells and, more particularly, to an apparatus and method of stacking and manifolding unitized solid oxide fuel cells for ready connection and disconnection of gases to manifolds.

A fuel cell is basically a galvanic conversion device that electrochemically reacts a fuel with an oxidant within catalytic confines to generate a direct current. A fuel cell typically includes a cathode material that defines a passageway for the oxidant and an anode material that defines a passageway for the fuel. An electrolyte is sandwiched between and separates the cathode and anode materials. An individual electrochemical cell usually generates a relatively small voltage. Thus, to achieve higher voltages that are useful, the individual electrochemical cells are connected together in series to form a stack. Electrical connection between cells is achieved by the use of an electrical interconnect between the cathode and anode of adjacent cells. Also typically included in the stack are ducts or manifolding to conduct the fuel and oxidant into and out of the stack.

The fuel and oxidant fluids are usually gases and are continuously passed through separate cell passageways. Electrochemical conversion occurs at or near the three-phase boundary of the gas, the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Specifically, in a solid oxide fuel cell (SOFC), the fuel reacts with oxide ions on the anode to produce electrons and water, the latter of which is removed in the fuel flow stream. The oxygen reacts with the electrons on the cathode surface to form oxide ions that are conducted through the electrolyte to the anode. The electrons flow from the anode through an external circuit and then to the cathode. The circuit is closed internally by the transport of oxide ions through the electrolyte.

In a SOFC, the electrolyte is in a solid form. Typically, the electrolyte is made of a nonmetallic ceramic, such as dense yttria-stabilized zirconia (YSZ) ceramic, that is a nonconductor of electrons which ensures that the electrons must pass through the external circuit to do useful work. As such, the electrolyte isolates the fuel and oxidant gases from one another and allows a potential to build up across it as a result of the difference in electrochemical potential between the fuel and the oxidant. The anode and cathode are generally porous, with the anode oftentimes being made of nickel/YSZ cermet and the cathode oftentimes being made of doped lanthanum manganite. In the solid oxide fuel cell, hydrogen or a hydrocarbon is commonly used as the fuel, while oxygen or air is used as the oxidant.

As mentioned above, the voltage output of a single fuel cell is far too low for many applications. Thus, it frequently becomes necessary to connect multiple fuel cells in series to obtain high voltage power. Additionally, the power demands of many systems require that fuel cells frequently be connected in electrically parallel circuits, thereby providing a greater total current. The physical stacking of multiple fuel cells in series, parallel or series/parallel configuration, however, must incorporate gas-tight connections to allow for a safe and efficient flow of reaction gases. Typically, a group of individual fuel cells are welded, soldered or otherwise bonded together into a single unitary stack, thereby preventing the improper mixing of the reaction gasses, such as in U.S. Pat. No. 5,861,221.

For any given cell, defects can occur during processing. A cell can also become damaged during handling. Because some defects may have been undetected, their negative affects, such as poor performance and consequent effects on its neighboring cells or even the entire stack, are not realized until the cell is placed in the stack. Where adjacent cells are fused or bonded together into a single unitary stack, a single cell that is defectively formed cannot be removed and interchanged with a non-defective cell. At best, the performance of the fuel cell stack becomes impaired. At worst, the entire stack must be discarded due to the failure of a single cell.

In addressing the above drawbacks, the assignee of the present invention has developed a unitized fuel cell that is the subject of U.S. patent application Ser. No. 09/419,343 filed Oct. 15, 1999. The unitized cell includes a first electrically conductive interconnect operatively connected to an anode of the fuel cell. The first interconnect has a first substantially planar portion and a first skirt portion. A second electrically conductive interconnect is operatively connected to a cathode of the fuel cell. The second interconnect has a second substantially planar portion and a second skirt portion, with the second skirt portion being juxtaposed to the first skirt portion. A first salient is formed by a portion of at least one of the first and second skirt portions, with the first salient being disposed at a first edge of the fuel cell. A second salient is formed by a portion of at least one of the first and second skirt portions, with the second salient being disposed at a second edge of the fuel cell. An insulating gasket is disposed between the first and second skirt portions and against the ceramic cell to seal the gases within their respective cell housings. The first and second salients can be attached to a gas manifold by attaching a tube to the skirt of the metal housing. Thus, the fuel cell can be electrically connected with other fuel cells in series and parallel configurations through contacts between metal housings and/or through metal gas manifold tubings. A series connection is made when the anode interconnect of one cell is made in contact with the cathode of its adjacent cell whereas a parallel connection can be made if a metal gas tubing is used to electrically connect similar electrodes of two different cells.

While the use of unitized fuel cells solves many drawbacks in the prior art, design issues relating to the actual stacking and manifolding of fuel cells remain. For example, U.S. Pat. No. 5,298,341 describes prior art as including fuel cell stacks that are arranged in a block configuration. With the stacks positioned adjacent to one another, a manifold is attached to all gas channels of the same orientation. Another prior art design is described as manifolding each stack individually. However, both prior art designs are described as having numerous disadvantages. Thus, U.S. Pat. No. 5,298,341 provides a module having stacks of fuel cells. The fuel cells in each stack are arranged to provide an overall rectangular configuration to the stack. The stacks are oriented on edge and radially spaced apart around a central plenum. The fuel cells in the stacks have gas passageways that extend parallel and perpendicular to the longitudinal axis of the plenum. Circular manifold plates are positioned above and below the module. Each plate has gas flow apertures that coincide with the position of the stacks and a plenum aperture that coincides with the position of the central plenum. In this design, individual stacks may be replaced or repaired but it will be difficult to remove individual cells without affecting the integrity of the neighboring cells.

In U.S. Pat. No. 4,048,385, manifolding is directed to planar, cylindrical shaped fuel cells. The cells include a central active portion surrounded by a frame portion. The frame portions contain duct openings so that when the cells are in a stack, the combined frame portions provide channels extending parallel to the longitudinal axis of the stack. The channels provide inlet and outlet means for different gases. Hollowed out portions in the frame portions allow the passage of gases between the channels and active portions. End plates are then used to sandwich the above components. In this design, holes around the perimeter of the cell can become weak spots that may cause the cell to fracture when placed under the stress of a stack assembly.

Another example of manifolding is in U.S. Pat. No. 4,876,163 that discloses tubular shaped fuel cells with their longitudinal axes aligned parallel to one another. Having such parallel orientation, the fuel cells are arranged in either concentric circles, a spiral, or folded rows. Manifolds are located at the distal ends of the cells. The arrangement was intended to reduce the flow of heat from an interior location of the fuel cell stack to a peripheral location. It was also intended to enable series connection. This design, while being applicable to tubular cells, is not applicable to planar cells.

As can be seen, there is a need for an improved solid oxide fuel cell stack and method of stacking such cells. Another need is for a planar, solid oxide fuel cell stack that provides improved stacking and manifolding. A further need is for a stack design that incorporates unitized fuel cells. Also needed is a fuel cell stack design that minimizes the footprint of the stack. Yet another need is for a fuel cell stack design that allows easy connection and disconnection of gases to the stack.

SUMMARY OF THE INVENTION

In one aspect of the present invention, a fuel cell stack comprises a plurality of planar fuel cells juxtaposed to and angularly offset from one another; and a manifold assembly operatively adjacent to the fuel cells, with the manifold assembly being in gas communication with each of the fuel cells.

In another aspect of the present invention, a method of forming a fuel cell stack comprises juxtaposing a plurality of planar fuel cells to one another, with the fuel cells having a pair of planar interconnects that sandwich an anode, cathode, and electrolyte therebetween; orienting the fuel cells in a spiral configuration; interfacing a manifold assembly to the fuel cells; and placing each of the fuel cells in gas communication with the manifold assembly.

These and other features, aspects and advantages of the present invention will become better understood with reference to the following drawings, description and claims.

DETAILED DESCRIPTION OF THE INVENTION

While the present invention is described below in the context of solid oxide fuel cells, the present invention may also be used in the context of other types of fuel cells. Further, even though the present invention contemplates that each of the fuel cells 10 in a fuel cell stack 23 be identical, it is also contemplated that the cells 10 can be different. For example, one intermediate cell may serve a special purpose, such as for cooling, containing catalyst, gas conditioning, and others, and thus designed differently from the rest of the cells.

Figure 1:
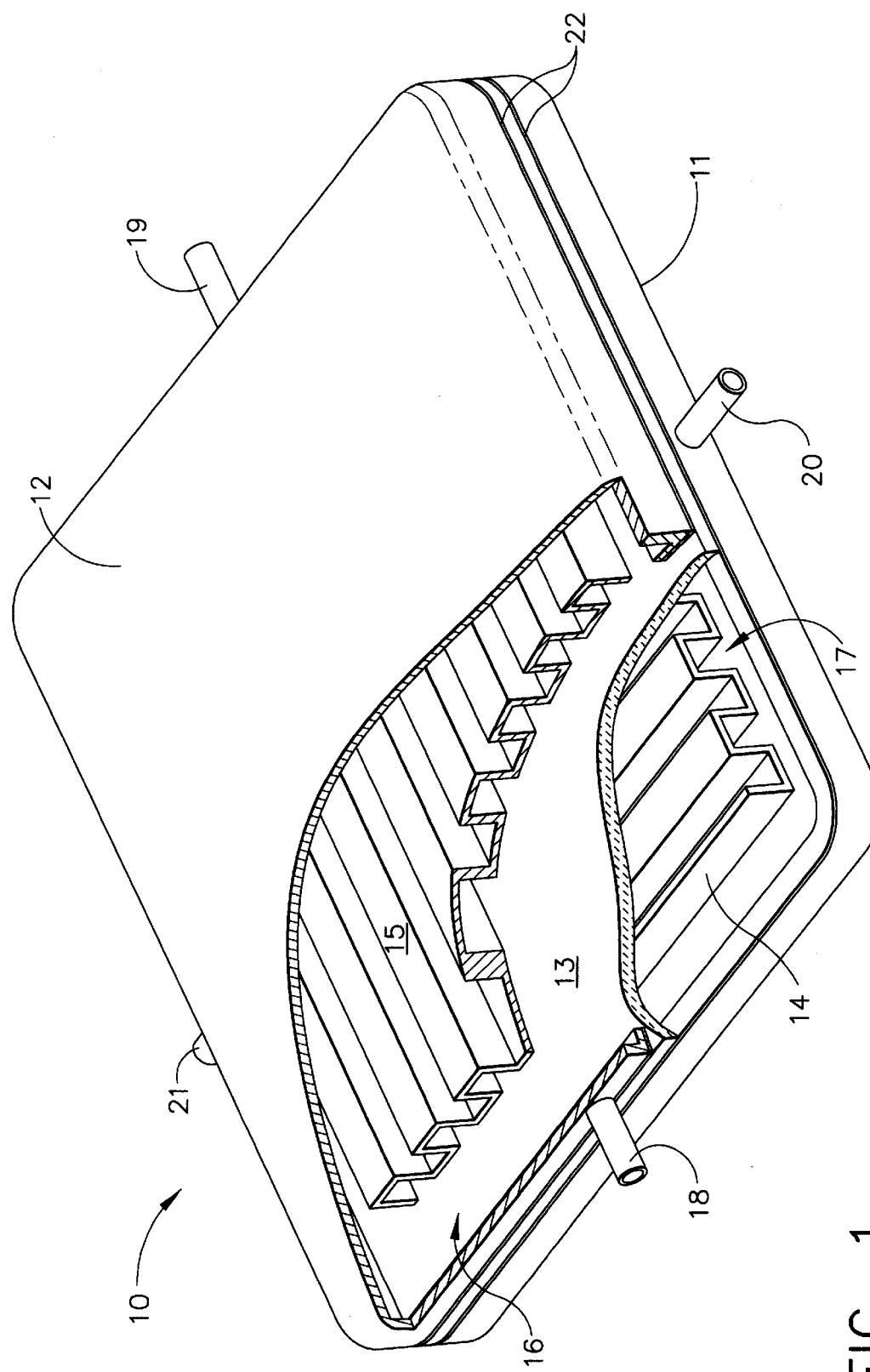
FIG. 1 is a perspective view of a unitized fuel cell that can be incorporated into a fuel cell stack according to the present invention.

FIG. 1 depicts one embodiment of a fuel cell 10 that can be utilized in a fuel cell stack 23 in accordance with the present invention. The cell 10 is characterized as being "unitized." This is intended to generally mean a self-contained fuel cell that can be replaced from a fuel cell stack without impairing the performance of the overall stack, such as by damaging adjoining cells. In FIG. 1, the unitized fuel cell 10 is shown as having a rectangular and planar configuration. However, shapes other than rectangular are contemplated.

The fuel cell 10 includes a first planar interconnect 11 that interfaces a second planar interconnect 12. The first and second interconnects 11, 12 sandwich therebetween a first gas distribution structure 14, a ceramic cell 13, and a second gas distribution structure 15. In general, and in the context of a solid oxide fuel cell, the ceramic cell 13 is constructed with an anode layer, a cathode layer, and an electrolyte layer therebetween according to any well-known construction in the art. The first and second gas distribution structures 14, 15 can be portions of the first and second interconnects 11, 12, respectively. Alternatively, the first and second gas distribution structures 14, 15 can comprise electrodes, such as an anode and cathode, as is also known in the art.

First gas channels are provided by the first gas distribution structure 14 and second gas channels are provided by the second gas distribution structure 15. The first and second gas channels enable gases, such as a fuel and an oxidant, to flow therein. In this embodiment, the first and second gas channels are oriented perpendicular to one another to provide a cross flow of gases. Channels may also be oriented parallel to each other to provide co-flow or counterflow of gases. A first salient 16, a second salient (not shown), a third-salient 17, and a fourth salient (not shown) are formed between the outer perimeter of the fuel cell 10 and the first and second gas distribution structures 14, 15.

A pair of opposing salients enables a gas, such as an oxidant, to pass through the fuel cell 10 via an oxidant inlet 18 and an oxidant outlet 19. Likewise, a gas, such as a fuel, is able to pass through the fuel cell 10 via a fuel inlet 20 and a fuel outlet 21. Even though the inlets 18, 20 and the outlets 19, 21 are shown as being generally at the mid-point between the corners of the cell 10, their positions can be different, such as at the corners. The entire cell 10 is then sealed by a gasket 22 between the first and second interconnects 11, 12 and against the edge of the ceramic cell 13. The gasket 22, along with the ceramic cell, also electrically insulates the first metal interconnect 11 from the second metal interconnect 12.

Figure 2:
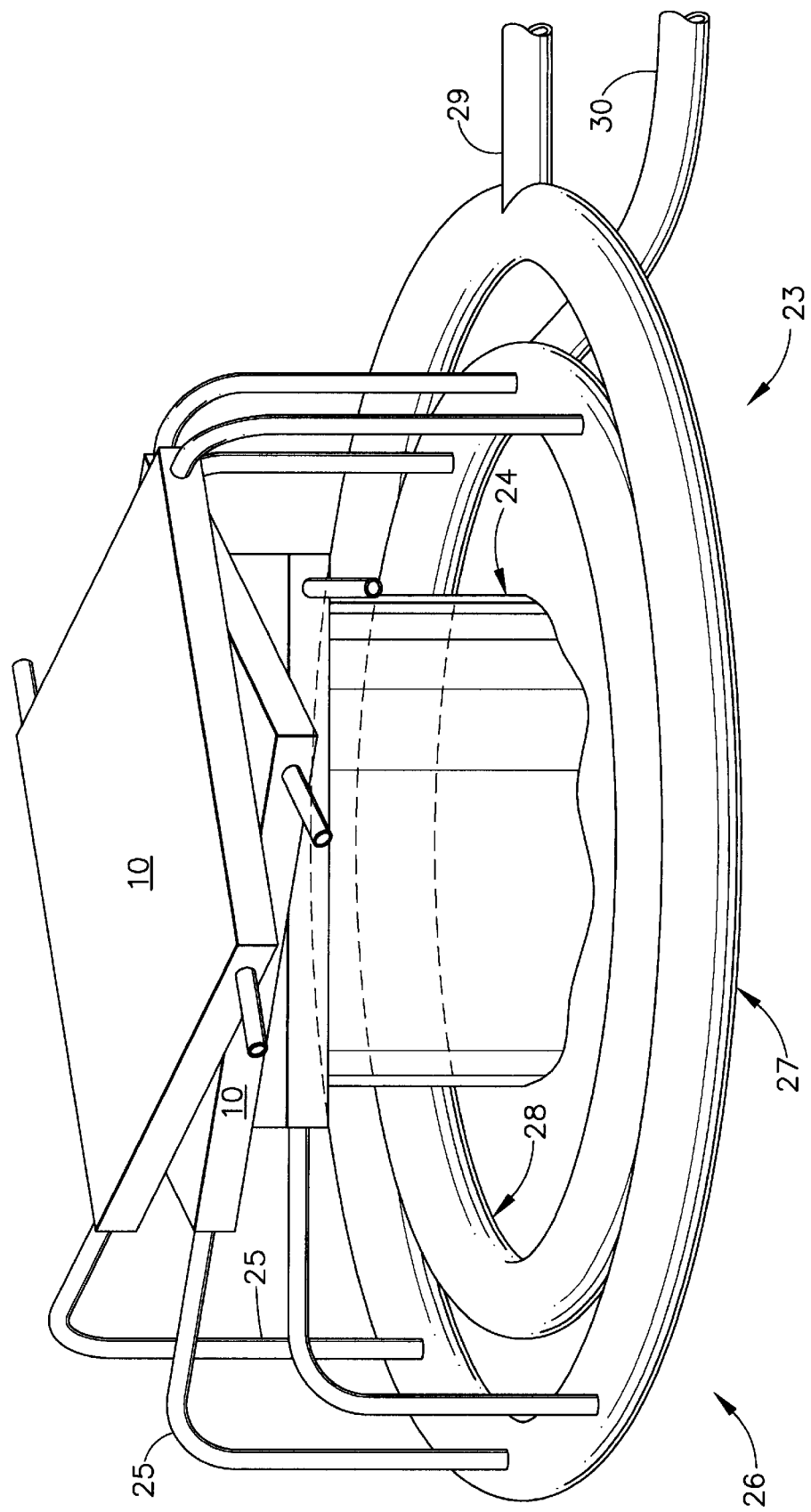
FIG. 2 is a perspective view of a partial fuel cell stack according to the present invention.

FIG. 2 depicts one embodiment of a fuel cell stack 23. However, for ease of illustration, only a portion of the fuel stack 23 is depicted. The stack 23 includes a plurality of fuel cells 10 that are positioned in respective planes that are generally parallel to one another. In particular, the first and second interconnects 11, 12 of each cell 10 preferably lie in their respective plane. The overall configuration of the cells 10 may be generally described as spiral. In such a configuration, the cells 10 are angularly offset to one another about an axis that extends perpendicular to the planes in which the cells 10 lie. The amount of angular offset can vary, depending upon the desired cell 10 density. Thus, a higher cell 10 density will require a smaller offset, while a lower cell 10 density will allow a higher offset.

The embodiment of FIG. 2 depicts each of the immediately adjacent cells 10 as only partially overlapping one another. In other words, the outer perimeter of one cell 10 does not completely match the angular position of the outer perimeter of an immediately adjacent cell 10. The partial overlap provides ease of manifolding and thermal distribution as further described below. However, it can be appreciated that as the number of cells 10 increases, the cells 10 may eventually circle around in the spiral such that non-immediately adjacent cells 10 will completely overlap. For example, if it takes twenty cells 10 to complete a circle, the first cell 10 and the $20^{th}$ cell 10 will completely overlap. While the foregoing is a preferred embodiment, it is also contemplated that immediately adjacent cells 10 can completely overlap. Similarly, the spiral of cells 10 does not have to be a complete circle. The repeating cycle may be within part of a circle. For example, cells 10 of a stack 23 may be divided into groups each consisting of a given number of cells 10. The cells 10 in each group may be spiraled to just within a 90° span and each group is stacked directly over one another.

The depiction of the fuel cell stack 23 in FIG. 2 is only partial insofar as the cells 10 are shown with only a single gas inlet 18 or 20 and a single gas outlet 19 or 21 for purposes of illustration. It can be seen that a gas tube 25 extends from the gas inlet of each cell 10 and to a manifold assembly 26 disposed below the cells 10, when viewed from FIG. 2. Similarly, a gas tube 25 extends from the gas outlet of each cell 10 and to the manifold assembly 26. The gas tube 25 from the gas inlet enables a gas, such as fuel, to flow from the manifold assembly 26 and to the cell 10.

FIG. 2 is also a partial depiction of the fuel cell stack 23 insofar as the manifold assembly 26. The assembly 26 is shown as having a single inlet manifold 27 and a single outlet manifold 28. However, the manifold assembly 26 actually includes a pair of inlet manifolds and a pair of outlet manifolds, as further described below in reference to FIGS. 3A–C.

In still referring to FIG. 2, it can be seen that for this embodiment, the inlet manifold 27 has circular configuration located below the lowermost fuel cell 10, when viewed from FIG. 2. The manifold 27 can be a pipe, typically having a round cross section. It may be lying on a plane that is horizontal in position or that is in a tilted manner. The diameter of the inlet manifold 27 is preferably as much as or greater than the longest width of the fuel cells 10. Thereby, the outer perimeter of the inlet manifold 27 is operatively adjacent the outer perimeters of the fuel cells 10.

The outlet manifold 28 is also planar and circular in configuration. It is disposed within and concentric to the inlet manifold 27. A gas outlet 30 communicates with the outlet manifold 28 to allow the expulsion of a gas, such as a fuel or an oxidant, from at least one of the cells 10 via the tube 25. Likewise, a gas inlet 29 communicates with the inlet manifold 27 to provide a supply of gas, such as a fuel or an oxidant, to at least one of the cells 10 via the tube 25. Of course, it is preferred to have each of the cells 10 in gas communication with the inlet and outlet manifolds 27, 28. Stack support 24 provides a stand for the stack 23 to elevate the stack 23 with respect to the manifolds 27, 28 and/or the ground.

Figure 3B:
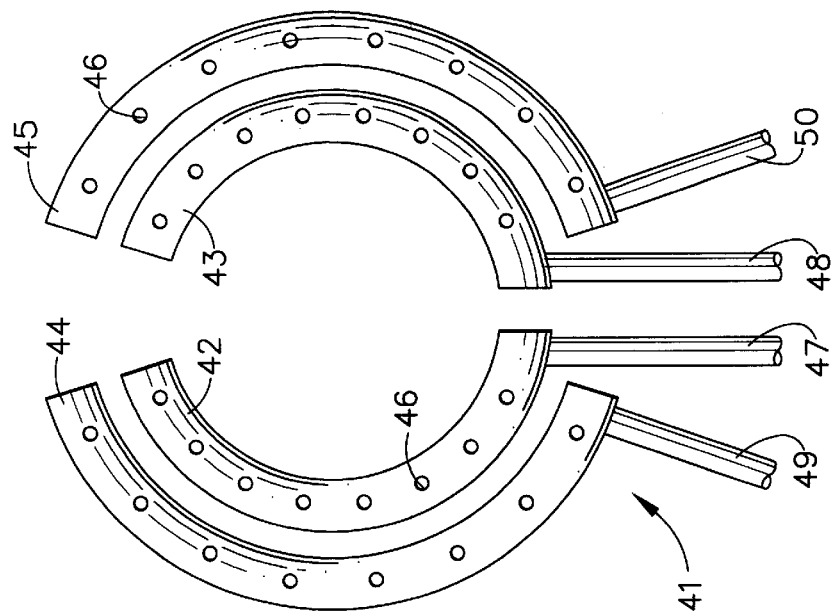
FIG. 3b is a top view of a second embodiment of a manifold assembly that can be used in a fuel cell stack according to the present invention.
Figure 3A:
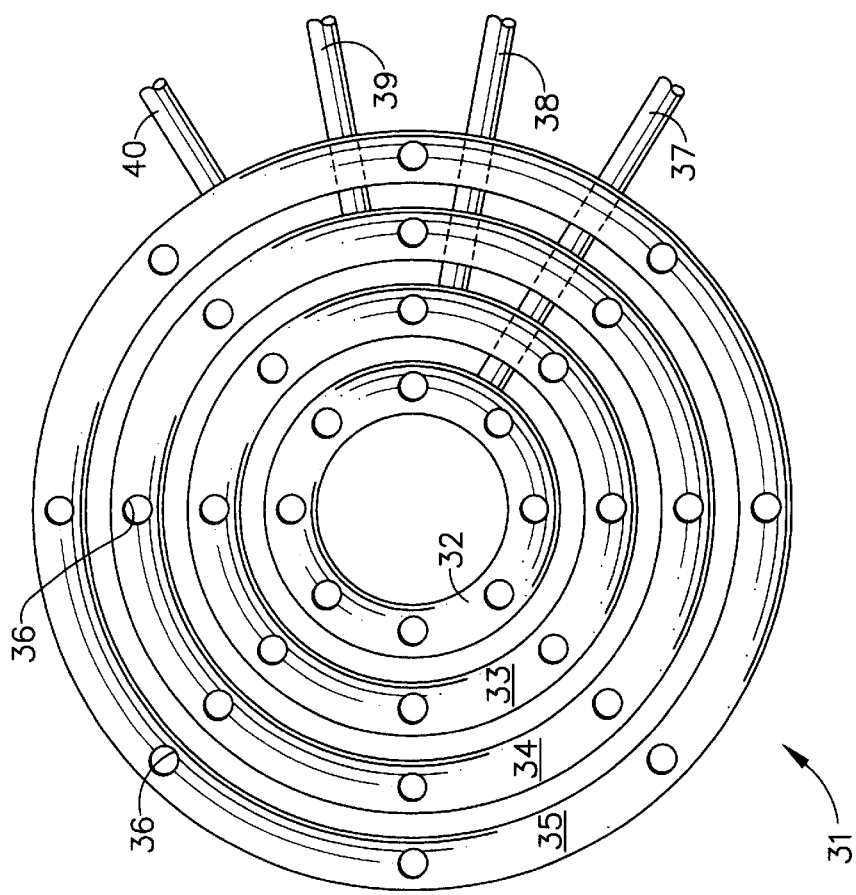
FIG. 3a is a top view of one embodiment of a manifold assembly that can be used in a fuel cell stack according to the present invention.

FIG. 3A represents one preferred embodiment of a manifold assembly 31. In this embodiment, four planar and circular manifolds 32–35 are provided concentric to one another. The innermost manifold 32 has a diameter that is as much as or greater than the longest width of the fuel cells. The manifolds 32–35 can be either an inlet or outlet manifold to provide a pair of inlet manifolds and a pair of outlet manifolds. The manifolds 32–35 are respectively in gas communication with gas inlet/outlets 37–40.

A plurality of circumferentially spaced apart manifold openings 36 are provided in each of the manifolds 32–35 and are operatively adjacent to the outer perimeters of the fuel cells. The openings 36 provide gas communication between the gas tubes 25 and its respective manifold 32–35. Although openings are shown in FIG. 3A as being equally spaced apart for any one manifold 32–35, unequal spacing for one or more manifolds 32–35 is contemplated. Likewise, even though the openings 36 are shown as being in the same circumferential position from manifold-to-manifold, different circumferential positions are contemplated.

FIG. 3B represents a second preferred embodiment of a manifold assembly 41. In this embodiment, four planar and semicircular manifolds 42–45 are provided in pairs. The pairs of manifolds 42–45 are oriented in two concentric circles. As in FIG. 3A, manifold openings 46 ate provided in the manifolds 42–45 and spaced apart circumferentially. The manifolds 42–45 can be either inlet or outlet manifolds and are connected to gas inlet/outlets 47–50.

Figure 3C:
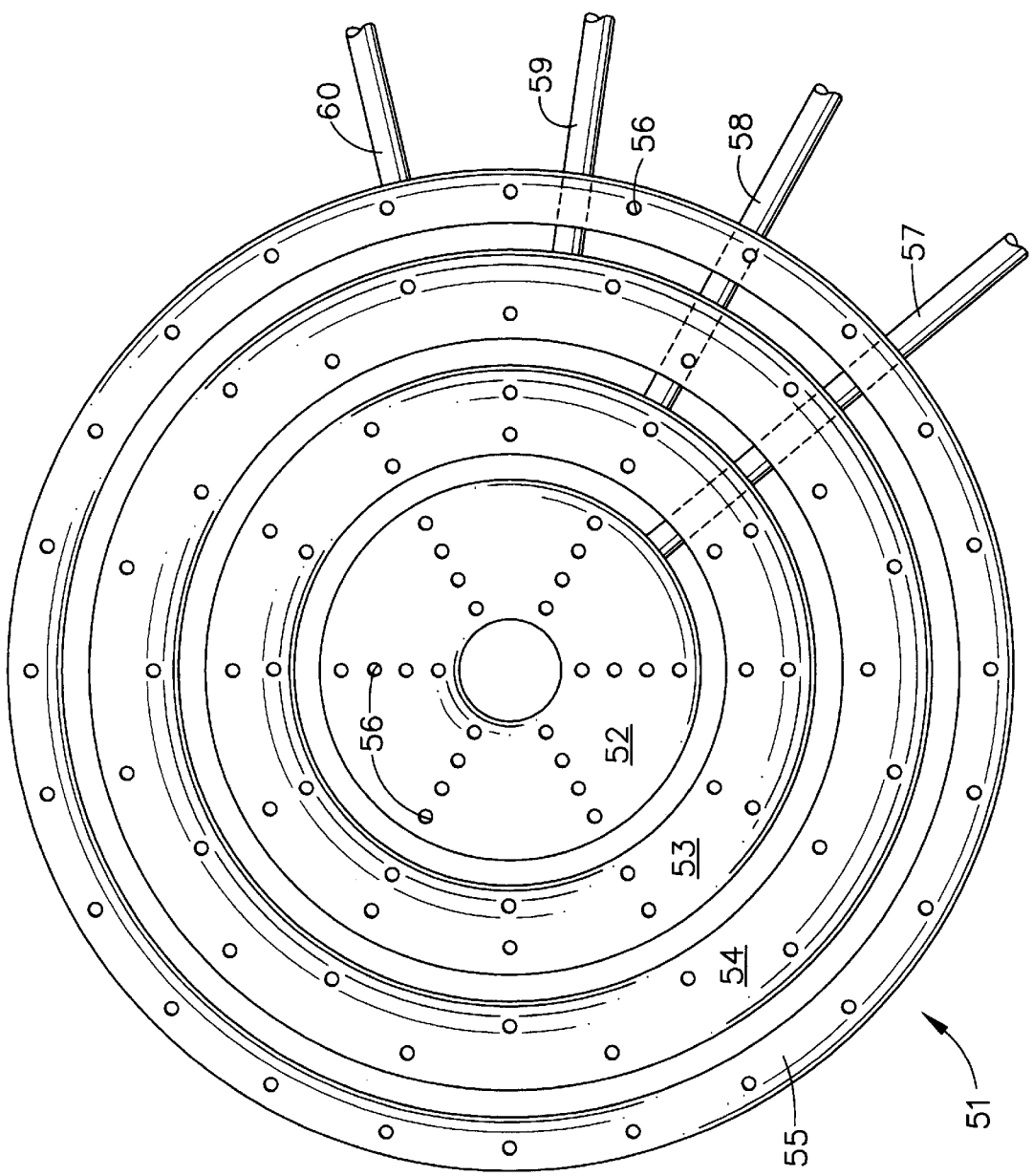
FIG. 3c is a top view of a third embodiment of a manifold assembly that can be used in a fuel cell stack according to the present invention.

FIG. 3C represents a third preferred embodiment of a manifold assembly 51. In this embodiment, four planar and circular manifolds 52–55 are provided concentric to one another. In contrast to the above embodiments, the manifolds 52–55 have different widths in their radial directions. Further, whereas the above embodiments provided single spaced apart manifold openings, the manifold openings 56 in the manifolds 52–55 are spaced apart in a plurality of openings 56. The manifolds 52–55 can be either inlet or outlet manifolds and are connected to gas inlet/outlets 57–60.

In view of the above, it can be seen that the present invention also provides a method of making a fuel cell stack. The method includes juxtaposing a plurality of planar fuel cells to one another. Thereby, one interconnect of one fuel cell oppositely faces another interconnect of an adjacent fuel cell. Further, the pair of interconnects in any one fuel cell are positioned in a respective plane and the planes of all of the fuel cells are substantially parallel to one another. The method further includes orienting the fuel cells in a spiral configuration and interfacing a manifold assembly to the fuel cells. Thereafter, the fuel cells are placed in gas communication with the manifold assembly.

As can be appreciated by those skilled in the art, the present invention provides an improved solid oxide fuel cell stack and method of stacking such cells. The solid oxide fuel cell stack in accordance with the invention provides improved stacking and manifolding. The fuel cell stack design of the present invention incorporates unitized fuel cells and minimizes the footprint of the stack. This is accomplished by having the manifolds directly below the fuel cells. Further provided by the present invention is a fuel cell stack design that allows easy connection and disconnection of gases to the stack. By the use of convenient fittings, each of the gas tubes 24, 25 can be connected or disconnected to the manifolds 27, 28, thereby allowing a particular cell 10 to be removed or replaced with little disturbance to adjacent cells 10.

Also, the present invention minimizes the thermal gradient that otherwise exists in a stack of cells. During power generation, a cell will be colder in the gas inlets because of the colder gases and hotter in the gas outlets because of the reaction heat generated throughout the cell. If the cells are stacked in a conventional way, one completely overlaying the other, the outlet corners will be combinedly much hotter, usually a hundred of degrees Celsius or higher, than the gas inlet corners. This can create tremendous thermal stress and material property gradient across the cell/stack. By spiraling the cells 10, the outlets are not exactly in the same place and, therefore, the heat is dispersed and distributed.

It should be understood, of course, that the foregoing relates to preferred embodiments of the invention and that modifications may be made without departing from the spirit and scope of the invention as set forth in the following claims.

We claim:

1. A fuel cell stack, comprising:
   a plurality of planar fuel cells juxtaposed to and angularly offset from one another; and
   a manifold assembly operatively adjacent to the fuel cells, said manifold assembly being in gas communication with at least one of said fuel cells.

2. The stack of claim 1, wherein a first planar interconnect of one fuel cell is in parallel opposition to a second planar interconnect of an adjacent fuel cell.

3. The stack of claim 1, wherein said fuel cells are angularly offset such that immediately adjacent fuel cells only partially overlap one another.

4. The stack of claim 1, wherein said fuel cells are angularly offset such that at least one immediately adjacent fuel cell completely overlaps another.

5. The stack of claim 1, wherein said fuel cells are angularly offset such that non-immediately adjacent fuel cells completely overlap one another.

6. The stack of claim 1, wherein said gas communication includes a flow of fuel and oxidant between said fuel cells and manifold assembly.

7. The stack of claim 1, further comprising a plurality of tubes that provide said gas communication between said fuel cells and manifold assembly.

8. A planar fuel cell stack, comprising:
   a plurality of planar fuel cells in a spiral configuration; and
   a manifold assembly operatively adjacent to said fuel cells, said manifold assembly including an inlet manifold and an outlet manifold in gas communication with at least one of said fuel cells;
   wherein said fuel cells are angularly offset to one another.

9. The stack of claim 8, wherein said fuel cells are positioned in planes substantially parallel to one another.

10. The stack of claim 9, wherein said fuel cells comprise a first planar interconnect and a second planar interconnect, said first and second interconnects being positioned in said planes.

11. The stack of claim 8, wherein said fuel cells are angularly offset to one another such that immediately adjacent fuel cells only partially overlap one another.

12. The stack of claim 8, wherein said manifold assembly further comprises a pair of inlet manifolds and a pair of outlet manifolds, said inlet and outlet manifolds being in gas communication with each of said fuel cells.

13. The stack of claim 8, further comprising a plurality of tubes intermediate said at least one fuel cell and said inlet and outlet manifolds.

14. The stack of claim 8, further comprising a support intermediate said fuel cells and manifold assembly.

15. A method of forming a fuel cell stack, comprising:
    juxtaposing a plurality of planar fuel cells to one another, said fuel cells having a pair of interconnects that sandwich an anode, cathode; and electrolyte therebetween;
    angularly offsetting said fuel cells to one another;
    interfacing a manifold assembly to at least one of said fuel cells; and
    placing said at least one fuel cell in gas communication with said manifold assembly.

16. The method of claim 15, wherein the step of juxtaposing comprises interfacing an interconnect of one fuel cell to an interconnect of another fuel cell.

17. The method of claim 15, wherein the step of angularly offsetting comprises partially overlapping immediately adjacent fuel cells.

18. The method of claim 15, wherein the step of angularly offsetting comprises completely overlapping at least one immediately adjacent fuel cell.

19. The method of claim 15, wherein the step of angularly offsetting comprises completely overlapping non-immediately adjacent fuel cells.

20. The method of claim 15, wherein the step of angularly offsetting comprises positioning said fuel cells in a spiral configuration.

21. A method of forming a fuel cell stack, comprising:
    juxtaposing a plurality of planar fuel cells to one another, said fuel cells having a pair of planar interconnects that sandwich an anode, cathode; and electrolyte therebetween;
    orienting said fuel cells in a spiral configuration wherein said fuel cells are angularly offset to one another;
    interfacing a manifold assembly to said fuel cells; and
    placing each of said fuel cells in gas communication with said manifold assembly.

22. The method of claim 21, further comprising positioning said fuel cells in planes substantially parallel to one another.

23. The method of claim 22, wherein said fuel cells comprise a first planar interconnect and a second planar interconnect, and further comprising positioning said first and second interconnects in said planes.

24. The method of claim 21, further comprising partially overlapping immediately adjacent fuel cells to one another.

25. The method of claim 21, further comprising separating said fuel cells into a plurality of groups, and said fuel cells in at least one group are in a spiral configuration.

26. The method of claim 21, further comprising positioning a plurality of manifold openings in said manifold assembly operatively adjacent a perimeter of at least one of said fuel cells.

* * * * *